(12) United States Patent
Hudson

(10) Patent No.: US 10,851,919 B2
(45) Date of Patent: Dec. 1, 2020

(54) FIRE RESISTANT FLEXIBLE HOSE (71) Applicant: AFLEX HOSE LIMITED, Halifax (GB)

(72) Inventor: Jeremy Hudson, Halifax (GB)

(73) Assignee: Aflex Hose Ltd, Halifax (GB)

(*) Notice: Subject to any disclaimer, the term of this patent is extended or adjusted under 35 U.S.C. 154(b) by 276 days.

(21) Appl. No.: 16/084,429

(22) PCT Filed: Feb. 20, 2017

(86) PCT No.: PCT/GB2017/050430
§ 371 (c)(1),
(2) Date: Sep. 12, 2018

(87) PCT Pub. No.: WO2017/158316
PCT Pub. Date: Sep. 21, 2017

(65) Prior Publication Data
US 2019/0078708 A1    Mar. 14, 2019

(30) Foreign Application Priority Data
Mar. 15, 2016   (GB) .................................. 1604356.4

(51) Int. Cl.
F16L 59/14 (2006.01)
F16L 11/12 (2006.01)
(Continued)

(52) U.S. Cl.
CPC .............. *F16L 11/125* (2013.01); *B32B 1/08* (2013.01); *B32B 3/30* (2013.01); *B32B 5/02* (2013.01);
(Continued)

(58) Field of Classification Search
CPC ....... F16L 59/153; F16L 59/14; F16L 59/141; F16L 11/087; F16L 11/088; G02B 6/4436; G02B 6/443
(Continued)

(56) References Cited

U.S. PATENT DOCUMENTS 4,488,577 A   12/1984   Shilad et al.
5,023,295 A    6/1991   Bosch et al.
(Continued)

FOREIGN PATENT DOCUMENTS

EP   0359251        3/1990
EP   1141605 B1    10/2002
(Continued)

OTHER PUBLICATIONS

International Search Report and Written Opinion, International Patent Application No. PCT/GB2017/050430, dated May 22, 2017 (13 pages).
(Continued)

*Primary Examiner* — Patrick F Brinson
(74) *Attorney, Agent, or Firm* — Hamre, Schumann, Mueller & Larson, P.C.

(57) ABSTRACT

A flexible fire resistant hose assembly having a multilayer structure in which a radially inner fluoroplastic liner tube comprises a convolution or groove at an external facing surface. The inner liner tube is surrounded by a plurality of thermally insulating layers and a braided or woven reinforcement layer. Such layers are then encapsulated by at least one radially rubber cover layer. A hose assembly end fitting arrangement is also provided in which an end fitting is crimped to a hose end via a two component end fitting and a portion of the end fitting is surrounded by rubber.

24 Claims, 3 Drawing Sheets (51) Int. Cl.
  B32B 5/02    (2006.01)
  B32B 5/26    (2006.01)
  B32B 15/02   (2006.01)
  B32B 15/088  (2006.01)
  B32B 15/18   (2006.01)
  B32B 25/04   (2006.01)
  B32B 25/10   (2006.01)
  B32B 27/06   (2006.01)
  B32B 27/12   (2006.01)
  B32B 1/08    (2006.01)
  B32B 3/30    (2006.01)
  B32B 25/16   (2006.01)
  B32B 27/32   (2006.01)
  B32B 15/08   (2006.01)
  B32B 25/20   (2006.01)
  B32B 17/02   (2006.01)

(52) U.S. Cl.
  CPC ........... *B32B 5/024* (2013.01); *B32B 5/26* (2013.01); *B32B 15/02* (2013.01); *B32B 15/08* (2013.01); *B32B 15/088* (2013.01); *B32B 15/18* (2013.01); *B32B 17/02* (2013.01); *B32B 25/04* (2013.01); *B32B 25/10* (2013.01); *B32B 25/16* (2013.01); *B32B 25/20* (2013.01); *B32B 27/06* (2013.01); *B32B 27/12* (2013.01); *B32B 27/32* (2013.01); *B32B 27/322* (2013.01); *F16L 59/145* (2013.01); *B32B 2250/05* (2013.01); *B32B 2262/02* (2013.01); *B32B 2262/0269* (2013.01); *B32B 2262/10* (2013.01); *B32B 2262/101* (2013.01); *B32B 2262/105* (2013.01); *B32B 2262/108* (2013.01); *B32B 2307/304* (2013.01); *B32B 2307/306* (2013.01); *B32B 2307/3065* (2013.01); *B32B 2307/50* (2013.01); *B32B 2307/546* (2013.01); *B32B 2307/7242* (2013.01); *B32B 2307/7265* (2013.01); *B32B 2597/00* (2013.01); *B32B 2605/18* (2013.01)

(58) Field of Classification Search
  USPC ............... 138/121–127, 149; 428/36.91
  See application file for complete search history.

(56) References Cited

U.S. PATENT DOCUMENTS

| 5,413,147 | A  | 5/1995  | Moreiras et al. |
| 6,394,144 | B1 | 5/2002  | Whitworth |
| 2007/0141284 | A1 | 6/2007 | Carpenter et al. |
| 2008/0029178 | A1 | 2/2008 | Bentley et al. |
| 2011/0253243 | A1 | 10/2011 | Tomerlin et al. |
| 2012/0125470 | A1 | 5/2012 | Nanney et al. |
| 2012/0227851 | A1 | 9/2012 | Stroempl et al. |

FOREIGN PATENT DOCUMENTS

| GB | 2345110 A | 6/2000 |
| JP | 62-066083 U | 4/1987 |
| JP | 63-183842 A | 7/1988 |
| JP | 2002-065590 A | 3/2002 |
| JP | 2008-132659 A | 6/2008 |
| JP | 2010-500523 A | 1/2010 |
| JP | 2013-242044 A | 12/2013 |
| KR | 20-0454175 | 6/2011 |
| KR | 10-1340282 | 12/2012 |
| WO | 2006/047691 A2 | 5/2006 |
| WO | 2008/016625 A2 | 2/2008 |
| WO | 2008/017868 A2 | 2/2008 |

OTHER PUBLICATIONS

Combined Search and Examination Report, GB Application No. 1604356.4, dated Sep. 5, 2016 (5 pages).

FIRE RESISTANT FLEXIBLE HOSE

FIELD OF INVENTION

The present invention relates to a fire resistant flexible hose assembly and in particular, although not exclusively, to a multilayer hose assembly configured to perform satisfactorily for a sufficient time period before failure when exposed to accidental fire conditions.

BACKGROUND ART

Flexible hoses for internal fluid containment and transport have been used widely for a variety of applications including aircraft engines, trains, engine based vehicles and machinery. Such hose assemblies are required to operate and maintain integrity at high internal fluid pressures over long periods. Other important characteristics include low permeability to moisture and gases, chemical compatibility with internal fluids being conveyed, resistance to damage from the external conditions, excellent flexibility and kink resistance.

In particular, flexible hoses are typically used to transfer fuels, oils and gases within the aviation and aerospace fields in situations where high pressure ratings and excellent flexibility are required. In such applications, in the event of a fire breaking out, hoses may be subject to flame and high temperatures of around 1000° C. Accordingly, it is a significant advantage if a hose is capable of continuing to perform satisfactorily for a sufficient time to allow fire control procedures to be taken. For example, in an aviation application and in the event of fire, a hose carrying flammable liquids such as fuel under pressure is required to withstand the high temperature and mechanical agitation for a significant period of time without failure. Should the hose fail, fuel will leak under pressure causing an explosive expansion of the fire. When a hose containing hydraulic oil fails, hydraulic pressure is lost and hydraulic system failures result.

Aerospace standard SAE AS1055 defines fire resistant tests for flexible hose assemblies for use with fuels and oils in aircraft. The important fire test forming part of the standard involves a hose sample being subjected to a kerosene flame at a temperature of 1083° C. with a flame intensity of 4500 Btu/h (1320 watts). Vibration is applied to the end of the assembly with an amplitude of 1.59 mm at 2000 cycles/m (33 Hz) with fluid under pressure flowing through the assembly. The hose assembly is required to withstand fluid leakage for at least 15 minutes under test conditions.

A number of flexible hoses have been developed in an attempt to maintain fluid transport operation within flame and high temperature environments. U.S. Pat. No. 4,488,577 describes a fire resistant hose comprising an inner rubber tube surrounded by a fibre glass or asbestos fire resistant layer. The fire resistant layer is encapsulated by a steel wire braid that is coated by an outer layer of rubber. WO 2006/047691 and WO 2008/016625 disclose similar hose constructions in which one or more woven metal layers encapsulate or reinforce thermal insulating layers. US 2012/0227851 discloses a high temperature fire sleeve comprising a PTFE core, a first reinforcement layer and an outer reinforcement layer that together encapsulate a thermal insulating layer, with an impervious.

However, these hose designs are either not able to pass the AS 1055 fire test, or are otherwise disadvantageous for a number of reasons. In particular, conventional hose assemblies comprising hose and end fittings which satisfy other requirements are typically not configured to satisfy AS 1055, either because the hose layers are burned through completely or because the end fitting connection is thermally degraded, loosened and ultimately separated from the hose body, in both cases causing fluid leakage prior to test completion.

As will be appreciated, hoses for use in the aviation industry should be lightweight, compact, pressure resistant and exhibit excellent flexibility whilst satisfying the required international standards. In this regard, reducing the number and thickness of layers and hence the outside diameter and weight of the hose is often advantageous. However, reducing the number of such layers and/or individual layer thicknesses can diminish the capability of the hose in various ways, in particular reducing the level of thermal insulation, and hence the capability of the hose to withstand the effects of fire. Another example would be a hose with an outermost external woven or braided layer of stainless steel wire described within US 2012/0227851, which is susceptible to a particular type of chemical attack known as 'chloride stress corrosion' when exposed to small quantities of chlorides, typically sodium chloride (salt) or other chemical treatments which are often applied to roads and in particular aircraft runways as de-icers. Accordingly, what is required is a hose assembly and end fitting arrangement that addresses the above problems.

SUMMARY OF THE INVENTION

It is an objective of the present invention to provide a flexible hose assembly suitable to withstand high temperature environments and in particular a naked flame at temperatures above a 1000° C. for a predetermined time period so as to be suitable for use in the transport of gases and liquids and in particular fuels and oils. It is a further specific objective to provide a hose assembly configured for operation at high pressures and exhibiting excellent flexibility as well as being sufficiently light weight for use in the aviation industry. One objective is to provide a flexible hose to form a component part of an aeroplane or aerospace craft in which the hose assembly is configured to withstand fire for a significant period of time (i.e., above 15 minutes) without failure and in particular to contain the pressurised internal fluid without fluid leakage for this time period during which the hose assembly has been exposed continuously to flame at high temperatures.

It is a further specific objective to provide a lightweight flexible hose assembly incorporating a hose and one or a plurality of attached end fittings configured to satisfy aerospace standards SAE AS1055; SAE AS2078A; SAE AS1946; SAE AS640 and SAE AS1339, the tests and in particular test descriptions of which are incorporated by reference.

The objectives are achieved by providing a lightweight flexible hose assembly having a multilayer structure that includes a radially inner fluoropolymer inner liner tube having a grooved external facing surface that is surrounded by at least one thermal barrier layer (alternatively termed a thermally insulating layer) and at least one reinforcement layer which is in turn, surrounded by at least one outer rubber cover layer. The inventors have identified that a fluoroplastic based heat resistant inner liner tube that comprises external convolutions (e.g., a helical groove) formed by peaks and troughs in the external facing surface of the liner tube body with an un-convoluted, smooth inside facing surface provides a number of significant advantages when forming part of a hose assembly exposed to the high temperature environments of the various aerospace standards identified herein. In particular the externally convoluted or grooved inner liner tube (via its ribbed external facing region) provides a hose that is capable of absorbing a significant amount of heat without creating a radially outward expansion force that distorts the hose to an extent where the hose either fractures to form a leak in the body of the hose between the end fittings, or separates from one or more end fittings to which the hose is attached. The inventors have identified that a polytetrafluoroethylene (PTFE), perfluoroalkoxy alkane (PFA) or a fluorinated ethylene propylene (FEP) heat resistant inner liner tube having a grooved external facing surface as particularly advantageous when forming part of a hose assembly to satisfy various aerospace standards identified herein and in particular being resistant to failure when exposed to fire.

Advantageously, the external facing convolutions within the fluoroplastic inner liner tube are formed into the tube wall thickness by a hot-forming process as described in Patent EP 1 141 605 which may be applied to a standard internally and externally smooth (non-profiled) tube and which is incorporated by reference. Accordingly, the wall thickness of the present helically convoluted externally ribbed liner tube is larger in the rib section than the wall thickness of the standard tube from which it is formed. When the present liner tube is placed in contact with a radially outer layer a gap region is created between the radially adjacent inner tube and the adjacent radially outer layer by virtue of the space between the peaks of helical rib that defines the radially external facing groove. This air filled gap, space or cavity region within the groove acts as a thermal insulating barrier between the adjacent radially outer layer and much of the inner liner tube. Accordingly, thermal conduction from the outermost cover layer to the radially inner liner tube is reduced relative to a non-convoluted internal liner tube at least during an initial time period when the hose is exposed to fire. Additionally, the liner tube the trough region or relatively radially thin 'web section' of the tube (axially between the ribs) is subject to the cooling effect from the cold fluid passing through the hose bore.

Advantageously, the inner liner tube, via the heated compression process by which the external groove is formed, comprises a degree of 'plastic memory' that increases the fire resistance of the assembly and provides a hose that satisfies the various aerospace standards identified herein. In particular, when the present hose is subjected to high levels of heat applied to the external cover layer, the inner liner tube is eventually heated and deformed and in particular the external facing convolutions or ribs undergo a deformation change and the outside diameter of the rib sections are reduced in diameter such that the liner tube returns to the pre-convoluted (standard) tube shape profile having a relatively smooth external facing surface. Accordingly the heated liner tube adopts a smaller radial wall thickness relative to the convoluted pre-heated liner tube. Such a configuration is advantageous in that the externally convoluted liner tube does not expand in the same way that a standard non-profiled liner tube would. In particular, in an end fitting assembly, the heated convoluted liner tube is radially compressed between an outer collar and an inner spigot (to attach an end fitting), and the reduction in the wall thickness of the liner tube (resultant from the 'plastic memory') acts to off-set the thermal expansion of the liner tube material due to the elevated temperatures. Such a configuration does not occur in a standard tube where material is subjected to thermal volumetric expansion and is effectively 'squeezed-out' from the region between the collar and spigot, causing severe deformation and weakening of the end fitting attachment.

Accordingly, the hose assembly between the outer collar and spigot is configured to maintain its position being axially locked against the end fitting. That is the present hose assembly is resistant to being axially forced from the end fitting by the internal fluid pressure that would otherwise occur for a conventional non-profiled standard wall liner tube. Accordingly, the present hose assembly delays significantly the time taken for thermal degradation of the liner tube to a point where the hose assembly fails by detachment of the hose from an end fitting.

The observed hysteresis within the inner liner tube (associated with forming the external facing ribs) is further advantageous to maintain the integrity of the hose along the majority of its length and spaced apart from and between the attached end fittings. That is, the decrease in the wall thickness of the present liner tube that occurs on heating, serves to decrease the radial outward expansion force exerted by the liner tube against the adjacent radially outer braided or woven layer. Accordingly, the present liner tube is not forced against the radially outer layer with a force sufficient to cause the liner tube to penetrate the interstitial openings in the layer that would otherwise distort and fracture the hose assembly. Additionally, the present hose assembly further avoids the alternate mechanism of failure typically associated with standard, non-profiled liner tubes in which the expansion in both volume and diameter cause the liner tube to fold when heated and rupture along the internal crease in the fold.

According to a first aspect of the present invention there is provided a flexible hose assembly comprising: a fluoropolymer inner liner tube having radially internal and external facing surfaces; at least one groove recessed in the liner tube at the external facing surface, the at least one groove extending along a length of the liner tube, the internal facing surface being substantially smooth relative to the external facing surface; at least one first woven or braided thermally insulating layer in contact with and provided over the liner tube; at least one reinforcement layer in contact with and provided over the first thermally insulating layer; at least one second woven or braided thermally insulating layer in contact with and provided over the reinforcement layer; and at least one rubber cover layer in contact with and provided over the second thermally insulating layer.

Advantageously, the thermally insulating layers act to contribute to the thermal insulation of the inner liner against the heat applied by an external fire. Accordingly, the thermally insulating layers are not required to contribute to a reinforcement of the inner tube against the effects of internal fluid pressure. However, the thermally insulating layers may provide a contribution, and in particular a minor contribution to reinforcement (although this is not their primary function).

The present hose construction is further advantageous by specifically positioning a thermally insulating layer radially between the inner liner tube and the radially outer reinforcement layer. According to one aspect, the reinforcement layer may be a metal weave or braid including in particular formed from a stainless steel wire. When such wire is heated to high temperatures, it is a characteristic of metals that heat transfer occurs rapidly. Accordingly, the radially intermediate thermal barrier layer prevents a rapid and damaging heat transfer from the reinforcement layer radially inward to the inner liner tube.

Optionally, the hose assembly comprises a first radially inner rubber cover layer and a second radially outer rubber cover layer, the radially outer cover layer provided in contact with and around the radially inner cover layer. The outer rubber cover may comprise one or a single layer of one type of rubber or two or at least two layers of the same or different types of rubber. Optionally, the at least one rubber cover layer may comprise a silicone rubber, a fluorosilicone rubber, or a ceramifiable silicone rubber. Optionally, the two cover layers of rubber may comprise a radially inner layer of silicone rubber, or fluorosilicone rubber, or ceramifiable silicone rubber, and the radially outer cover layer may comprise an alternative rubber best suited to the external conditions, which may comprise chlorosulphonated polyethylene (CSPE), or Ethylene Propylene Diene (EPDM) or Polychloroprene (Neoprene). The single cover layer or an inner layer of a plurality of cover layers may be configured specifically to undergo a chemical, physical and in some cases a morphological change when exposed to high temperature environments (i.e. flames) for extended time periods. Optionally, the rubber cover layer may comprise a ceramifiable material and in particular a ceramifiable silicone material.

Preferably, the first and second thermally insulating layers each comprise a textile structure formed as a weave or braid of monofilaments or fibres. Optionally, the first and second thermally insulating layers comprise any one or a combination of the set of: a heat resistant plastic; a polyaramid material; a glassfibre material; a ceramic fibre material; a mineral; a lava rock based material; or a basalt fibre material. Preferably, the first and second thermally insulating layers comprise a basalt fibre braid or weave.—Optionally, the first thermally insulating layer comprises a single layer or at least two layers. Optionally, the second thermally insulating layer comprises a single layer or at least two layers.

In particular, the present hose assembly may advantageously comprise a thermal barrier rubber cover layer that includes a 'ceramifiable' rubber based composite. The term 'ceramifiable' rubber based composite encompasses a material that comprises a rubber (organic or inorganic) matrix that incorporates or encapsulates filler particles or granules (dispersed in the matrix) that are configured to form a ceramic or ceramic like material when the composite is heated or exposed to temperatures greater than 300, 400, 500, 600, 700, 800, 900 or 1000° C.

The composite material is specifically adapted when exposed to high temperature to form a protective ceramic cover layer via a ceramisation process. In particular, as a polymer matrix, that forms part of the composite material, is degraded the filler particles adhere together via a fluxing agent to create a solid substantially continuous ceramic phase that is adapted specifically to provide optimum thermal insulation to the internal layers and in particular to the inner tube (that contains the fluid) from the external high temperature environment. Advantageously, the ceramifiable rubber composite is a low density material and hence lightweight in addition to being highly flexible via the rubber polymer matrix.

Preferably, the radially inner first thermally insulating layer, radially internal to the reinforcement layer and the second radially outer insulating layer applied external to, and over the reinforcement layer comprises a textile structure formed as a weave or braid.

Optionally, such materials may be formed as fibres, filaments, cords or thread woven or braided into a flexible, integral textile structure.

Optionally, the reinforcement layer comprises any one of the set of: a metal wire braid; a stainless steel wire braid; a heat resistant, high tensile strength plastic fibre braid.

Optionally, the reinforcement layer comprises one or two layers. Optionally, the reinforcement layer comprises one or two layers of a high tensile strength metal or high tensile strength textile braid or weave. Advantageously the at least one reinforcement layer provides reinforcement for the inner tube against the effects of the internal pressure exerted by the contained fluid by preventing expansion of the liner tube which would otherwise cause the liner tube to burst.

Such an arrangement of thermally insulating and reinforcement layers is advantageous to further partition the inner tube from the external environment. Optionally, where the second outer thermally insulating layer comprise two or three layers, the two or three layers may be positioned in direct contact with one another.

Optionally, the assembly comprises: a single first thermally insulating layer in contact with and provided over the liner tube; a single reinforcement layer in contact with and provided over the first thermally insulating layer; two second thermally insulating layers provided in contact with and over the reinforcement layer; wherein the rubber cover layer is provided in contact with and over the radially outermost layer of the second thermally insulating layer.

Preferably, the reinforcement layer comprises a metal braid or a plastic fibre braid. More preferably, the reinforcement layer comprises a stainless steel wire.

Optionally, the thermally insulating layers comprise a textile structure formed as a weave or braid, the weave or braid comprising a heat resistant and low thermal conductivity material and the reinforcement layer comprises a metal wire. Such a configuration is advantageous to facilitate containment of the inner liner tube that when heated may have a tendency to expand radially against the reinforcement layer. A non-metallic textile structure of the first thermally insulating layer in direct contact with the plastic inner liner tube reduces the likelihood of the material of the liner tube expanding into the interstitial regions between the weave or braid of the first reinforcement layer. The first thermally insulating layer also provides a thermally insulating barrier between the inner liner and the first reinforcement layer, which is advantageous when the first reinforcement layer is metal, since rapid heat transfer from the metal directly to the inner liner is avoided. A further advantage with the reinforcement layer comprising a metal and in particular a steel wire braid is to axially dissipate the heat and avoid the creation of 'hot spots' which may develop at discreet regions of the hose by thermally conducting heat axially along the metal wire strands.

Preferably, the groove is formed as a helical groove extending along a length of the liner tube and preferably along the complete axial length of the hose.

Preferably, the groove is formed as a single helical channel extending along a length of the external surface of the liner tube as a spiral centred on a longitudinal axis of the tube. Preferably, groove extends along the entire length of the liner tube between first and second ends. The external grooved profile of the tube is further advantageous to facilitate bending and flexing of the hose in normal use. Preferably, the inner liner tube comprises a fluoropolymer capable of continuous operation at temperatures up to 260° C.

Preferably, the inside surface of the liner tube is smooth and not grooved to ensure non-turbulent, high rates of fluid flow.

Optionally, the liner tube comprises any one of: a perfluoroalkoxy alkane (PFA) or polytetrafluoroethylene (PTFE) or fluorinated ethylene propylene (FEP). Fluoropolymers such as PTFE, FEP and PFA are not only capable of continuous operation at high temperatures, but also are exceptionally chemically resistant to all types of oils, fuels and chemicals with which they may come into contact within aerospace and other applications. Preferably, the inner tube comprises a smooth radially inward facing surface (non-profiled relative to the external facing surface of the inner liner tube) so as to define an internal bore having a smooth internal facing surface.

Optionally, the cover layer comprises one, two or a plurality of layers of rubber. Preferably, a single rubber cover layer or a radially inner layer of a plurality of cover layers comprise any one of a set of: a silicone rubber, a fluorosilicone rubber or a ceramifiable rubber based composite. Optionally the hose may comprise two cover layers in which a radially outer cover layer comprises; a chlorosulphonated rubber (chlorosulphonated ethylene, CSPE); polychloroprene (neoprene); an ethylene propylene based rubber (ethylene propylene diene monomer (m-class) rubber, EPDM). The material of the single cover layer and the inner cover layer of the plurality of cover layers is advantageously configured for flame and heat resistance. In some applications, a single cover layer construction also provides protection against external conditions, such as contact with chemicals, fuel and oils. In other applications, a protective, radially outer second rubber layer is advantageous to prevent contact between the external conditions and the heat resistant inner rubber layer. Where the subject invention comprises two cover layers a radially outer cover layer is sacrificial in the event of a fire, and is therefore not intended to contribute to the fire resistance of the hose assembly, and serves the purpose of protecting the inner rubber cover layer from the external conditions.

Optionally, the single rubber cover layer, or the radially inner cover layer of a plurality of cover layers may be configured to undergo a ceramisation process and form a dense solid continuous ceramic phase. Such an arrangement is advantageous to further thermally insulate the internal layers and in particular the inner liner tube from the high temperature flame at the hose exterior.

Preferably, the rubber cover layer is provided in direct contact with the second thermal barrier layer with no intermediate layer or structure. Optionally, a radial wall thickness of the rubber outer cover layer is greater than a radial wall thickness of each of the liner tube and the reinforcement layer. Such an arrangement is advantageous to optimise the hose for fire resistance and to satisfy SAE AS1055 by providing a hose that is suitably flexible whilst optimised for high temperature resistance by providing sufficient thermal insulation to the inner liner tube.

Optionally, where the rubber cover layer comprises a ceramifiable silicone rubber based composite the composite may be formed from an organopolysiloxane, a metal oxide and a metal-organopolysiloxane complex. In one aspect, the metal oxide may comprise aluminium oxide and the metal-organopolysiloxane complex may comprise platinum. Optionally, the silicone based composite material comprises peroxidically crosslinkable or condensation-crosslinkable silicone rubber, metal oxides selected from the group consisting of magnesium oxide, aluminum oxide, tin oxide, calcium oxide, titanium oxide and barium oxide and metal compounds of this group which produce oxides on heating, boric acid, zinc borate, and also platinum complexes having at least one unsaturated group.

Optionally, the silicone rubber matrix comprises cross linked organopolysiloxane compositions. Optionally, the organopolysiloxanes may comprise reinforcing and/or non-reinforcing fillers such as pyrogenic or precipitated silicas. Non-reinforcing fillers may comprise powdered quartz, metal oxide powders such as aluminium oxide, titanium oxide, iron oxide, zinc oxide, barium sulphate, calcium carbonate, gypsum and other synthetic polymer powders. Optionally, the polymer matrix may comprise additives such as processing aids for example including plasticisers, pigments, stabilisers (e.g. heat stabilisers). Example plasticisers include polydimethylsiloxane and example heat stabilisers may comprise transition metal salts, iron octoate, or transition metal silanolates. Preferably, silicone rubber compositions may comprise condensation-cross linking organopolysiloxanes as described in EP 0359251 which is incorporated by reference.

Optionally the ceramifiable rubber layer may comprise a composite thermal barrier layer comprising: one or more metal oxides selected from the set of magnesium oxide, aluminium oxide, tin oxide, calcium oxide, titanium oxide and barium oxide, and/or compounds of these metals which yield oxides on heating, for example metal hydroxides; boric acid; zinc borate; and metal complexes.

Optionally, the ceramifiable rubber layer may comprise platinum complexes which have at least one unsaturated group, for example preferably platinum-olefin complexes, platinum-aldehyde complexes, platinum-ketone complexes, platinum-vinyl siloxane complexes or platinum-1,3-divinyl-1,1,3,3-tetramethyldisiloxane complexes with or without any detectable content of organic halogen; platinum-norbornadiene-methylacetonate complexes, bis (gamma-picoline) platinum dichloride, trimethylenedi-pyridineplatinum dichloride, dicyclopentadieneplatinum dichloride, (dimethylsulfoxide) (ethylene) platinum (II) dichloride, reaction products of platinum tetrachloride with olefins and with primary amines, secondary amine, or both primary and secondary amines for example the reaction product of sec-butylamine with platinum tetrachloride dissolved in 1-octene, particularly preferably the platinum-1, 3-divinyl-1, 1,3,3-tetramethyldisiloxane complex.

According to a second aspect of the present invention there is provided a flexible hose comprising: a hose assembly as claimed herein; a connection body having at least a portion extending axially within the liner tube; and a collar having a portion extending over the reinforcement layer; the collar being capable of radial compression to enable the collar to be crimped onto at least a part of the hose assembly and to compress radially the liner tube and secure the connection body within the liner tube.

Preferably, a length of the rubber cover layer and the second thermally insulating layer at one end of the hose are removed to expose the reinforcement layer to allow the collar to be positioned over and in direct contact with an external facing surface of the reinforcement layer. Preferably, an axial length of the cover layer and second thermally insulating layer that are removed correspond approximately to an axial length of the connection body that extends axially within the liner tube. Preferably, the liner tube, the first thermally insulating layer and the reinforcement layer are positioned radially between the connection body and the collar.

The hose assembly may further preferably comprise a rubber sleeve having a first end overlapping axially onto the rubber cover layer of the hose assembly and a second end overlapping axially onto at least a region of the connection body such that the sleeve extends axially between the hose assembly and the connection body to encompass radially the collar and at least an axial end part of the hose assembly and at least an axial region of the connection body.

The collar is capable of being radially compressed to enable the collar to be radially crimped onto a part of the hose which is positioned around the portion of the connection body that is inserted within the liner tube. Accordingly, when compressed, the collar is configured to radially compress onto the end of the hose and in particular to compress radially against the inner liner tube, the first thermally insulating layer and the reinforcement layer so as to secure and in particular lock the hose to the connection body and in particular to seal the inner liner tube against the connection body to prevent leakage.

Preferably, the rubber sleeve comprises an unvulcanised rubber which may be vulcanised in situ after positioning of the sleeve onto and around the connection body (or end fitting), collar and hose end. Optionally, the rubber sleeve comprises the same material as the rubber of the radially outermost rubber cover layer of the hose. Optionally, the rubber sleeve comprises an outside diameter larger than the external diameter of the rubber cover layer of the hose. Optionally, the rubber sleeve is formed from windings of unvulcanised rubber where the windings are configured to overlap the external facing surface of the outer rubber cover of the hose over a short axial length of typically 4 mm to 20 mm. Preferably, the rubber sleeve is configured to overlap a portion of the end fitting axially beyond the collar. Accordingly, the rubber sleeve comprises an axial length greater than the collar and the spigot that is positioned radially within the inner liner tube.

With the unvulcanised rubber sleeve positioned over and about one end of the hose and a portion of the connection body (or end fitting) the rubber sleeve is wrapped within a cloth or tape or encased within a mould and vulcanised. Such a process causes the rubber to bond to the rubber cover layer of the hose so as to create an integral homogenous rubber construction at the hose end extending axially between the hose and the end fitting/connection body.

The present hose fitting arrangements are advantageous by having a single collar to secure each end fitting (connection body) instead of the two collars which are usually applied to secure conventional fire resistant hose and end fitting designs. The advantage of the present hose end fitting assembly having a single collar per end fitting (connection body) is that a high pressure capability is achieved, whilst minimising the complexity and the overall weight of the end fitting and hose assembly. Additionally, the rubber layer (sleeve) vulcanised over the collar thermally insulates the collar from the fire. Additionally, the thermal insulation between the end fitting collar and the inner liner tube is advantageously increased by presence of the first thermally insulating layer which reduces the flow of heat from the metal collar and metal reinforcement layer to the inner tube.

According to a third aspect of the present invention there is provided a method of manufacturing a hose assembly comprising: providing a fluoropolymer inner liner tube having at least one helical groove recessed in the liner tube at the external facing surface, the at least one groove extending axially along a length of the liner tube; covering the inner liner tube with at least one first thermally insulating layer; covering the first thermally insulating layer with at least one reinforcement layer; covering the reinforcement layer with at least one second thermally insulating layer; and covering the second thermally insulating layer with at least one rubber cover layer.

Optionally, the step of covering the second thermally insulating layer comprises covering the second thermally insulating layer with a first rubber cover layer and covering the first rubber cover layer with a second rubber cover layer. Preferably the second rubber cover layer comprises a material different to a material of the first rubber cover layer. Preferably, the first rubber cover layer comprises a heat resistant material such as a ceramifiable material and the second rubber cover layer comprises a chemical resistant and/or heat resistant material configured to protect or isolate for as long as possible the second rubber cover layer from the external environment.

According to a fourth aspect of the present invention there is provided a method of manufacturing a hose assembly as claimed herein and an end fitting comprising: separating and removing at least a portion of a length of the outer cover layer and the second thermally insulating layer so as to expose the reinforcing layer; positioning a collar over the reinforcing layer; inserting a connection body within the inner liner tube so that the collar axially surrounds an inserted portion of the connection body; radially compressing by crimping the collar onto the hose assembly so as to radially compress at least the inner liner tube against the insert portion of the connection body and secure the connection body within the inner liner tube.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

A multilayer hose 100 according to the subject invention is configured to exhibit flame resistance characteristics and is configured specifically to perform as a class A or B category hose assembly (when end fittings are attached to the hose) and the assembly is tested under international standard SAE AS1055. In addition, the present hose assembly arrangement is configured for use in high demand and high performance applications such as aerospace and aviation fields in the transport of liquids and gases in particular fuels and oils. The present hose assembly is particularly suited to perform as a class B product when tested under SAE AS1055.

Figure 1:
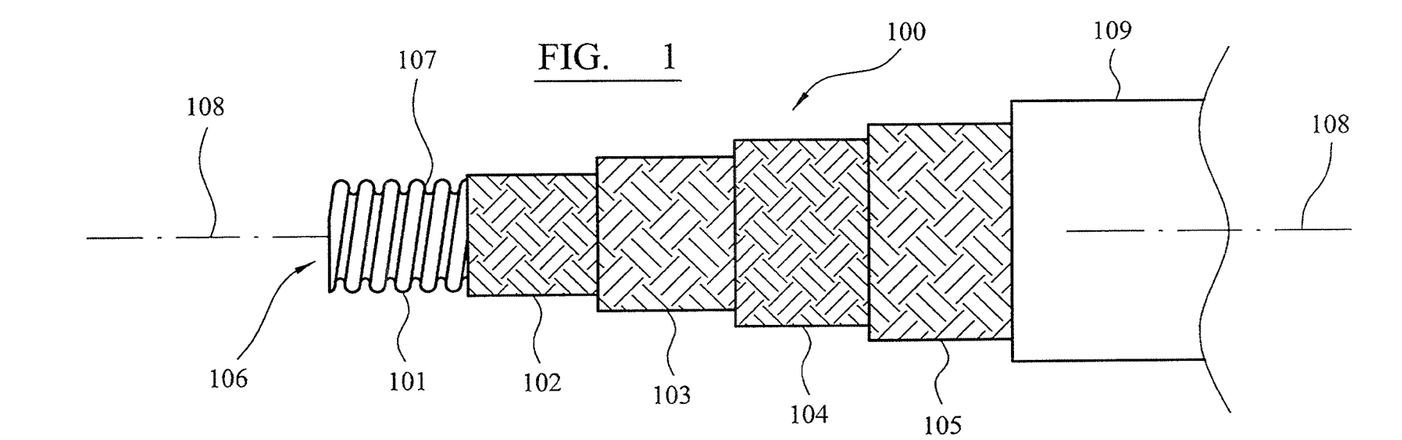
FIG. 1 is an external cut away view of a multilayer hose assembly according to one aspect of the present invention.
Figure 3:
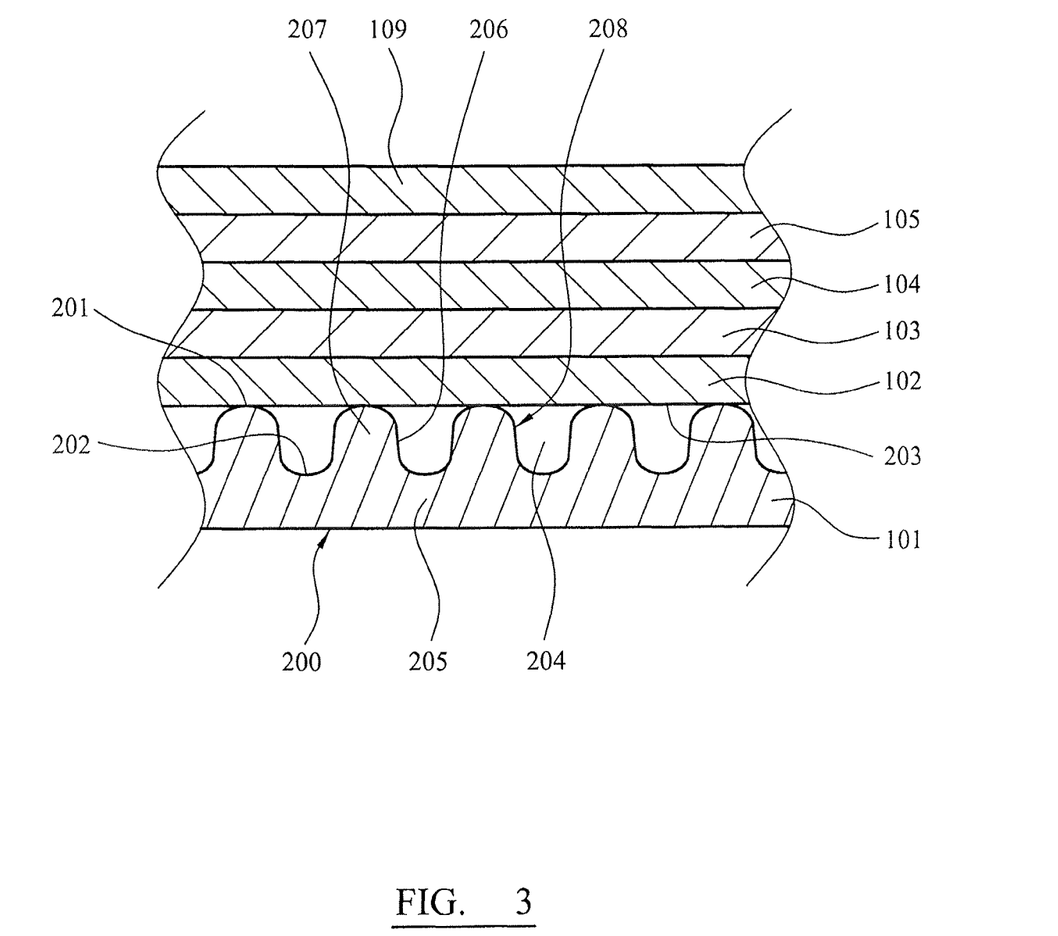
FIG. 3 is a cross sectional view of the hose assembly of FIG. 1.

Referring to FIGS. 1 and 3, a hose 100 comprises an inner core or inner liner tube 101 having a smooth internal bore 106 defined by an internal facing surface 200. An external facing region indicated generally by reference 107 comprises radially extending ribs 207 aligned transverse to a longitudinal axis 108 extending through hose 100. Ribs 207 define a helical groove 204 positioned axially between ribs 207. Helical groove 204 extends from a peak 201 of each rib 207 to a trough 202 representing a radially innermost part of an external facing surface 208 of tube 101. According to the specific implementation, a depth of groove 204 is in a range 50% to 75% of a total thickness of the liner body 101 defined between internal facing surface 200 and the axial position of rib peaks 201. Ribs 207 comprise sidewalls (or side surfaces) 206 that define each helical turn of the groove 204 with such surfaces 206 aligned generally transverse and optionally perpendicular to axis 108. Peaks 201 and troughs 202 are curved so as to provide a smooth transition into rib walls 206. A web section 205 is positioned radially inside of each trough 202 at a radial position between each trough 202 and inward facing surface 200. The web sections 205 comprise a reduced radial thickness relative to a section of the liner tube 101 through each rib 207. Accordingly liner tube 101 is capable of a high degrees of flex to provide an enhanced bending capability of the hose assembly 100. Additionally the reduced radial thickness at each web section 205 provides regions for thermal transfer from the body of the hose assembly 100 into the fluid passing through the internal bore 106. The present hose therefore is configured to dissipate heat into the moving fluid and accordingly is configured to exhibit enhanced resistance to elevated external temperatures. Tube 101 is surrounded by a braided or woven first thermally insulating layer 102. A braided or woven reinforcement layer 103 is arranged to cover and encapsulate first insulating layer 102. A braided or woven second thermally insulating layer 104 is positioned to surround reinforcement layer 103 which is sandwiched between the first and second insulating layers 102, 104. Second insulating layer 104 is encapsulated by a further or third insulating layer 105. According to the specific implementation, the first, second and third insulating layers 102, 104, 105 comprise the same material and/or structure. Finally, a heat resistant rubber cover layer 109 extends over and around the third insulating layer 105 to represent a radially outer jacket or cover of hose 100.

To be suitable for the transport of fuels and oils at high pressure and temperature in normal use, inner tube 101 is preferably formed from a fluoroplastic such as polytetrafluoroethylene (PTFE) or perfluoroalkoxy resin (PFA). Alternative materials for inner tube 101 comprise polychlorotrifluoroethylene (PCTFE) copolymer, eth-ylene-chlorotrifluoroethylene (ECTFE) copolymer, ethyl-ene-tetrafluoroethylene (ETFE) terpolymer, polyvinylidene fluoride (PVDF), polyvinylfluoride (PVF), and copolymers and blends of these materials. Inner tube 101 is configured to be 'chemically resistant' where this term encompasses inner tube 101 being resistant to swelling, cracking, corrosion and in particular to withstand acidic and alkaline conditions on exposure to hydrocarbons, organic and inorganic solvents, and chemically corrosive fluids and gases, including in particular fuels and oils used in aircraft.

In some embodiments, inner tube 101 may be configured to be electrically conductive to provide static charge dissipation to electrical grounding. Accordingly, the material of tube 101 may comprise PTFE with a suitable filler such as carbon black. According to other embodiments, inner tube 101 is devoid of electrically conducting filler and may comprise predominantly or exclusively PTFE, such as Teflon®.

According to the specific implementation, the first, second and third insulating layers 102, 104, 105 are formed from a non-metallic textile material. Preferably, the braid or woven yarn of the first, second and third insulating layers 102, 104, 105 formed from a mineral wool, lava rock or preferably a Basalt fibre braid. Optionally, the Basalt or lava material comprises a density 2.7 g/cm$^3$; an operational temperature of −160 to 800° C.; a softening temperature of 1050° C.; a linear density of 1200 tex; a yarn or filament diameter of 13 µm; an ultimate tensile strength of greater than 3000 MPa and a young's modulus of greater than 82 GPa. According to further embodiments, the first, second and third reinforcement layers 102, 104, 105 comprise a high temperature resistant, high tensile strength fibre, yarn or monofilament. Optionally, the yarn or monofilament or further components of the insulating layers 102, 104, 105 comprise a polyaramid fibre. The insulating layers 102, 104, 105 may be formed as a braid or weave so as to comprise a respective layer which is flexible, yet which provides thermal insulation to inner liner tube 101 reinforcement to hose assembly 100 to withstand the radially expanding and axially lengthening forces applied by the internally applied pressure which is exerted by the contained fluid.

According to the specific embodiment the reinforcement layer 103 comprises a metal wire, in particular stainless steel wire, which reinforces the first insulating layer 102 and inner liner tube 101 against dislodgement under the effects of fire. The density of the weave or braid of reinforcement layer 103 is less than that of the corresponding braided or woven first, second and third insulating layers 102, 104, 105.

The inner liner tube 101 is positioned in direct contact with the radially inner first insulating layer 102. In particular, the external facing surface 208 of liner tube 101 is positioned in direct contact with an internal facing surface 203 of first insulating layer 102. The reinforcing layer 103 is positioned in direct contact against the first insulating layer 102 and the second insulating layer 104 so as to be sandwiched radially between these two layers. The third insulating layer 105 is positioned in direct contact against the radially outer cover layer 109.

The radially external cover layer 109 is specifically adapted to thermally insulate the inner layers 102, 103, 104, 105 and the radially innermost liner tube 101 from the external high temperature environment, as would be encountered if hose assembly 100 were located within a fire. In particular, cover layer 109 is specifically configured to act as a thermal barrier layer to protect the inner layers 101 to 104 when exposed to temperatures in excess of 800° C. and in particular 1100° C. This is achieved as cover layer 109 is formed from a heat resistant rubber such as a fluoropolymer and/or a silicone based rubber. According to further specific implementations, cover layer 109 may comprise a ceramifiable rubber based composite and in particular a ceramifiable silicone rubber material. According to the further implementation, the silicone rubber comprises condensation-crosslinking silicone rubber that encompasses metal oxides or metal oxide precursors such as aluminium oxide, tin oxide and compounds of magnesium, aluminium, tin, calcium or barium which on heating produce oxides. The ceramifiable composite optionally includes at least one metal complex such as a platinum complex containing a hydrocarbon and in particular an unsaturated hydrocarbon or hydrocarbon group.

Optionally, the silicone rubber outer cover layer 109 comprises an organopolysiloxane such as dimethylsiloxane. According to further implementations, the ceramifiable rubber based composite layer 109 comprises 100 parts of a diorganopolysiloxane end-capped by trim-ethylsiloxy groups, composed of 99.93 mol percent of dimethylsiloxane units and 0.07 mol percent of vinylmethylsiloxane units and having a viscosity of 8-106 mPa-s at 25° C. mixed and heated at 150° C.; firstly with 50 parts of silicon dioxide produced pyrogenically in the gas phase and having a surface area of 200 m$^2$/g; secondly with 1 part of dimethylpolysiloxane end-capped by trimethylsiloxy groups and having a viscosity of 96 mPa-s at 25° C.; thirdly with 7 parts of a dimethylpolysiloxane having an Si-bonded hydroxyl group in each terminal unit and having a viscosity of 40 mPa-s at 25° C.; and fourthly with 36 parts of aluminium oxide having a particle size >10/z and having an alkali metal oxide content of <0.5% by weight, and 0.3% by weight of a platinum-1,3-divinyl-1,1,3,3-tetramethyldisiloxane complex. According to certain embodiments, the outer thermal barrier cover layer 109 may comprise Elastosil® available from Waker Chemi AG, Munich, Germany or Xiameter® from Dow Corning, Mich., USA.

Cover layer 109 may alternatively be formed from a chlorosulphonated rubber (hypalon), ethylene propylene diene monomer (m-class) resin (EPDM), polychloroprene (neoprene), or silicone rubber. Cover layer 109 being formed from rubber or a similar material provides an effective sealed barrier to encapsulate and provide a sealed partition of the inner layers 102, 103, 104, 105 and tube 101 from fluids (gases and liquids) that may come into contact with the external cover layer 109.

According to the specific implementation, cover layer 109 comprises a radial thickness greater than a corresponding radial thickness of inner tube 101 and insulating and reinforcement layers 102, 103, 104, 105. To optimise the fire resistance, the radial thickness of cover layer 109 is at least double the radial thickness of inner tube 101.

According to further specific implementations, a radial thickness of cover layer 109 is approximately equal to or less than a radial thickness of inner tube 101 as defined between the external facing surface 208 at peaks 201 and interfacing surface 200.

Figure 2:
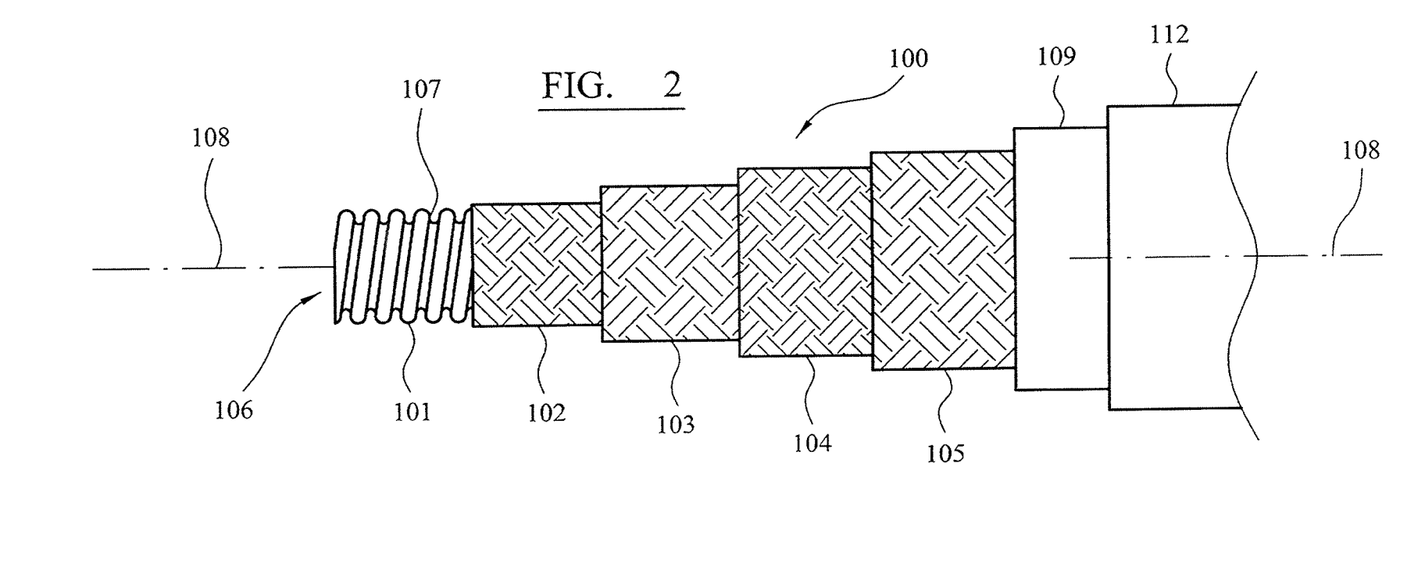
FIG. 2 is an external cut away view of a multilayer hose assembly according to a second aspect of the present invention.

Referring to FIG. 2, in some hose applications, a single outer rubber cover layer 109 may not be suitable for use with the external conditions, in particular in contact with certain fuels and solvents. Accordingly the present hose assembly 100 may further comprise a protective outer cover layer 112 added over and about an inner cover layer 109. Optionally, the radially outer cover layer 112 comprising a different rubber relative to inner cover layer 109 which can withstand the external conditions, and which layer 112 may be sacrificial in the event of a fire.

Figure 4:
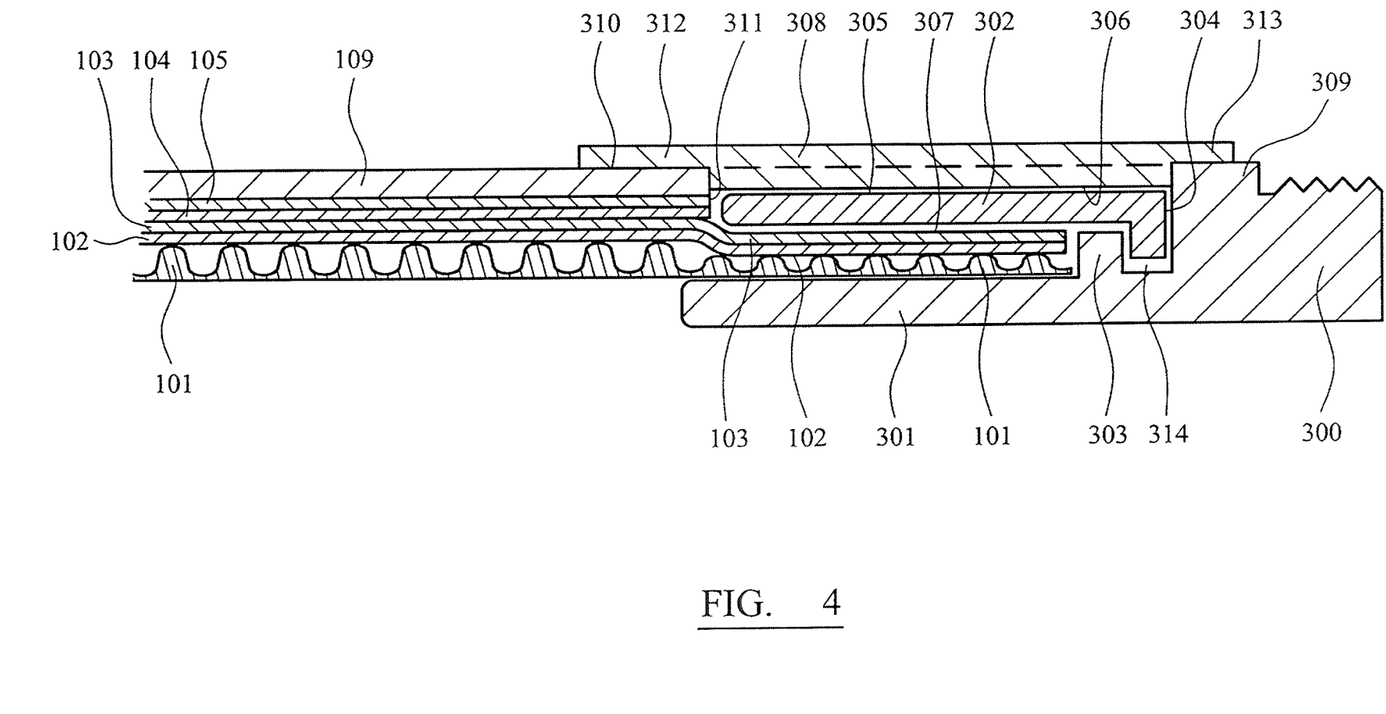
FIG. 4 is a partial cross sectional view of the hose of FIG. 1 secured to a hose end fitting according to one aspect of the present invention.

Referring to FIG. 4, hose 100 is suitably adapted for mounting an end fitting 300 at each axial end of hose 100 to form a hose assembly. End fitting 300 comprises a connection body having an axially extending portion (referred to herein as spigot) indicated generally by reference 301 suitable for placement within hose internal bore 106. Spigot 301 comprises a substantially cylindrical projection that extends axially from an annular shoulder 309 forming an integral part of end fitting 300. Optionally an external surface of spigot 301 is profiled to comprise one or a plurality of grooves such that when spigot 301 is inserted axially into bore 106, (and a radially outer collar 302 is crimped radially inward on the hose 100), inner tube 101 is deformed and in particular is compressed such that regions of tube 101 are forced into the annular spigot grooves 315. In some implementations, the spigot grooves may be formed as a helical groove to enable end fitting spigot 301 to be screwed into mating contact with the inner bore 106 of inner tube 101. End fitting 300 also comprises a secondary annular shoulder 303 extending radially from spigot 301 and separated axially from primary annular shoulder 309. An annular groove 314 is defined axially between the primary and secondary shoulders 309, 303.

End fitting 30 comprises a modular two-piece construction having an annular outer collar represented generally by reference 302. According to the specific implementation, outer collar 302 comprises an annular rib 304 that is dimensioned so that after radial compression it is located radially and axially to sit within the annular groove 314 defined between the primary and secondary shoulders 309, 303 of spigot 301.

According to the specific implementation, outer cover layer 109 and thermally insulating layers 104 and 105 at an axial end region of hose 100 are radially separated and removed so as to expose the reinforcement layer 103 along an axial length portion corresponding approximately to an axial length of end fitting collar 302 and the portion of spigot 01 inserted within bore 106. Accordingly, collar 302 is inserted into the region 311 that is created due to the removal of cover layer 109 and outer insulating layers 104 and 105. As such, collar 302 is positioned over and about reinforcement layer 103 and in particular directly against a radially outward facing surface 307 of reinforcement layer 103. Collar 302 is encapsulated radially by an unvulcanised rubber sleeve 308 that is positioned over end fitting 300 and the end of hose 100 connected to the end fitting 300. Rubber sleeve 308 preferably comprises the same material as the outer rubber cover layer 109. However, cover layer 109 is vulcanised as part of the hose assembly construction.

Rubber sleeve 308 comprises an axial length configured to overlap onto the outer cover layer 109 and a portion of the connection body 300. In particular, rubber sleeve 308 comprises a radially inward facing surface 306 that is positioned in direct contact with the radially outer surface 305 of collar 302 and against. Sleeve 308 comprises a first axial end 312 positioned to overlap axially onto external surface 310 of hose cover layer 109 and a second axial end 313 positioned to overlap axially onto end fitting shoulder 309. Accordingly, the axial and radial junction between the end of hose 100 and end fitting 300 is completely encapsulated and sealed by rubber sleeve 308.

Collar 302 is capable of being compressed radially onto hose 100 via a conventional crimping process so as to lock the hose assembly 100 to the end fitting 300. Accordingly, as collar 302 is forced radially onto hose layer 103, liner tube 101 compresses radially onto end spigot 301 so as to seal and secure end fitting 300 at the end of hose 100. To further secure collar 302 at hose 100, an axial mechanical lock is provided by the radial insertion (during crimping) of radially inward projecting rib 304 into the groove 314 defined between radially outward projecting shoulders 309 and 303 of the end fitting (connection body) 300. Accordingly, the present hose assembly is further configured, via the mechanical lock between rib 304 and shoulders 309 and 303, to withstand elevated internal pressures (within bore 106) which might otherwise axially separate the end fitting 300 from the hose 100. With collar 302 crimped in position to radially entrap layers 101, 102 and 103 against spigot 301, the rubber sleeve 308 is positioned and encapsulated within a cloth, tape or mould, and heated to vulcanise the rubber and cause it to bond to rubber cover 109.

Cover layer 109 thermally insulates the inner layers 101 to 105 to reduce the penetration of heat from an external fire. The first thermally insulating layer 102 acts to inhibit heat transfer from the reinforcement layer 103 to the inner liner tube 101. Similarly, the second and third thermally insulating layers 104, 105 act to inhibit the heat transfer from the external region of the hose to the reinforcement layer 103 and are particularly effective from external flames at temperatures of around 1100° C. Accordingly, the present hose assembly 100 is capable of withstanding such extreme high temperature environments for at least 15 minutes without failure as defined by leakage of fluid (liquid or gas) from within internal bore 106. The present hose construction comprising in particular the inner liner tube 101 having a convoluted (ribbed and grooved) external facing surface 208 is adapted to on the one hand increase the flexibility of the hose 100 along its main length and on the other hand to provide resistance to axial separation between the hose 100 and end fitting 300 when exposed to the extreme high temperature external environments. In particular, the grooved external facing surface 208 of liner tube 101 is advantageous in a number of respects and at different stages (time periods) during which the hose 100 is engulfed in flames from an initial start of a fire to a point where hose 100 is degraded to an appreciable extent so as to fail (by rupture of the inner liner tube 101 at a region along its length and/or the liner tube 101 being axially separated from the end fitting spigot 301). In a first aspect, the web sections 205 of the liner tube 101 (representing a respective radially thinner region of the tube 101) are preferentially cooled by the cold fluid passing through the hose bore. Moreover, the externally ribbed liner tube 101, (formed from a smooth internal and external facing PTFE tube via extrusion and hot-forming against a die) comprises an inherent 'plastic memory' or hysteresis such that when heated it undergoes a morphological change in that ribs 207 at least partially melt or flow into the gap regions defined by groove 204. Accordingly, when heated to the high temperatures (1100° C.), a radial wall thickness of liner tube 101 is decreased. This is advantageous to prevent liner tube 101 expending radially under collar 302 which would otherwise force hose 100 to separate axially from end fitting 300. Additionally, the capability of ribs 207 flowing into groove 204 prevents liner tube 101 being forced radially outward (via a thermal expansion) against the first insulating layer 102 and the radially outer reinforcement layer 103. As will be appreciated, if this were to happen, liner tube 101 would rupture resulting in hose failure via the loss of fluid from within the internal bore 106. Moreover, the air occupied gap regions defined by groove 204 provide a gas-phase thermal barrier layer that is effective to delay the heating of the body of liner tube 101 during the initial stages of exposure to the external fire and prior to the morphological change of the liner tube 101 as described.

Accordingly, the present hose assembly 100 provides a lightweight flexible hose attachable to end fittings via a robust, reliable and time efficient mechanism configured to satisfy aerospace standards SAE AS1055; SAE AS2078A; SAE AS1946; SAE AS640 and SAE AS1339, the tests, and in particular test descriptions, of which are incorporated by reference.

The invention claimed is:

1. A flexible hose assembly comprising:
a fluoropolymer inner liner tube having radially internal and external facing surfaces;
at least one groove recessed in the liner tube at the external facing surface, the at least one groove extending along a length of the liner tube, the internal facing surface being substantially smooth relative to the external facing surface;
at least one first woven or braided thermally insulating layer in contact with and provided over the liner tube;
at least one reinforcement layer in contact with and provided over the first thermally insulating layer;
at least one second woven or braided thermally insulating layer in contact with and provided over the reinforcement layer; and
at least one rubber cover layer in contact with and provided over the second thermally insulating layer.

2. An assembly as claimed in claim 1 comprising a first radially inner rubber cover layer and a second radially outer rubber cover layer, the radially outer cover layer provided in contact with and around the radially inner cover layer.

3. The assembly as claimed in claim 1 wherein the first and/or second thermally insulating layer each comprises a textile structure formed as a weave or braid of monofilaments or fibres.

4. The assembly as claimed in claim 1 wherein the first and/or second thermally insulating layer comprise any one or a combination of the set of:
a heat resistant plastic;
a polyaramid material;
a glassfibre material;
a ceramic fibre material;
a mineral;
a lava rock based material; or
a basalt fibre material.

5. The assembly as claimed in claim 1 wherein the first thermally insulating layer comprises a single layer or at least two layers.

6. The assembly as claimed in claim 1 wherein the second thermally insulating layer comprises a single layer or at least two layers.

7. The assembly as claimed in claim 1 wherein the reinforcement layer comprises any one of the set of:
a metal wire braid;
a stainless steel wire braid;
a heat resistant plastic fibre braid.

8. The assembly as claimed in claim 1 comprising:
a single first thermally insulating layer in contact with and provided over the liner tube;
a single reinforcement layer in contact with and provided over the first thermally insulating layer;
two second thermally insulating layers provided in contact with and over the reinforcement layer;
wherein the rubber cover layer is provided in contact with and over one of the radially outer second thermally insulating layers.

9. The assembly as claimed in claim 8 wherein the first and second thermally insulating layers comprise a basalt fibre.

10. The assembly as claimed in claim 8 wherein the reinforcement layer comprises a metal braid or a plastic fibre braid.

11. The assembly as claimed in claim 8 wherein the reinforcement layer comprises a stainless steel wire.

12. The assembly as claimed in claim 1 wherein the groove is formed as a helical groove extending along a length of the liner tube.

13. The assembly as claimed in claim 12 wherein the helical groove extends along the entire length of the liner tube between first and second ends.

14. The assembly as claimed in claim 12 wherein the groove is formed in the liner tube via a thermal forming process such that the liner tube comprises a degree of hysteresis and is configured to revert to a non-grooved profile when heated at temperatures at or above 250° C.

15. The assembly as claimed in claim 1 wherein the liner tube comprises any one of:
a perfluoroalkoxy alkane (PFA);
polytetrafluoroethylene (PTFE);
a fluorinated ethylene propylene (FEP).

16. The assembly as claimed in claim 1 wherein the rubber cover layer is provided in direct contact with the second thermal barrier layer with no intermediate layer or structure.

17. The assembly as claimed in claim 1 wherein a radial wall thickness of the rubber outer cover layer is greater than a radial wall thickness of each of the liner tube and the reinforcement layer.

18. A flexible hose comprising:
a hose assembly as claimed in claim 1;
a connection body having at least a portion extending axially within the liner tube; and
a collar having a portion extending over the reinforcement layer;
the collar being capable of radial compression to enable the collar to be crimped onto at least a part of the hose assembly and to compress radially the liner tube and secure the connection body within the liner tube.

19. The hose assembly as claimed in claim 18 wherein a length of the rubber cover layer and the second thermally insulating layer at one end of the hose are removed to expose the reinforcement layer to allow the collar to be positioned over and in direct contact with an external facing surface of the reinforcement layer.

20. The hose assembly as claimed in claim 19 wherein an axial length of the cover layer and second thermally insulating layer that are removed correspond approximately to an axial length of the connection body that extends axially within the liner tube.

21. The hose assembly as claimed in claim 18 wherein the liner tube, the first thermally insulating layer and the reinforcement layer are positioned radially between the connection body and the collar.

22. The hose assembly as claimed in claim 18 further comprising a rubber sleeve having a first end overlapping axially onto the rubber cover layer of the hose assembly and a second end overlapping axially onto at least a region of the connection body such that the sleeve extends axially between the hose assembly and the connection body to encompass radially the collar and at least an axial end part of the hose assembly and at least an axial region of the connection body.

23. A method of manufacturing a hose assembly comprising:
providing a fluoropolymer inner liner tube having at least one groove recessed in the liner tube at the external facing surface, the at least one groove extending axially along a length of the liner tube;
covering the inner liner tube with at least one first thermally insulating layer;
covering the first thermally insulating layer with at least one reinforcement layer;
covering the reinforcement layer with at least one second thermally insulating layer; and
covering the second thermally insulating layer with at least one rubber cover layer.

24. The method as claimed in claim 23 wherein the step of covering the second thermally insulating layer comprises covering the second thermally insulating layer with a first rubber cover layer and covering the first rubber cover layer with a second rubber cover layer.

\* \* \* \* \*